No. 853,212. PATENTED MAY 14, 1907.
H. J. ANDERSON.
PIN SETTER.
APPLICATION FILED SEPT. 13, 1906.

5 SHEETS—SHEET 1.

Witnesses.
Inventor.
Hans J. Anderson,
By Benedict, Morsell & Caldwell.
Attorneys.

No. 853,212. PATENTED MAY 14, 1907.
H. J. ANDERSON.
PIN SETTER.
APPLICATION FILED SEPT. 13, 1906.

5 SHEETS—SHEET 2.

Witnesses. Inventor
Hans J. Anderson,
By Benedict, Morsell & Caldwell,
Attorneys.

No. 853,212. PATENTED MAY 14, 1907.
H. J. ANDERSON.
PIN SETTER.
APPLICATION FILED SEPT. 13, 1906.
5 SHEETS—SHEET 3.
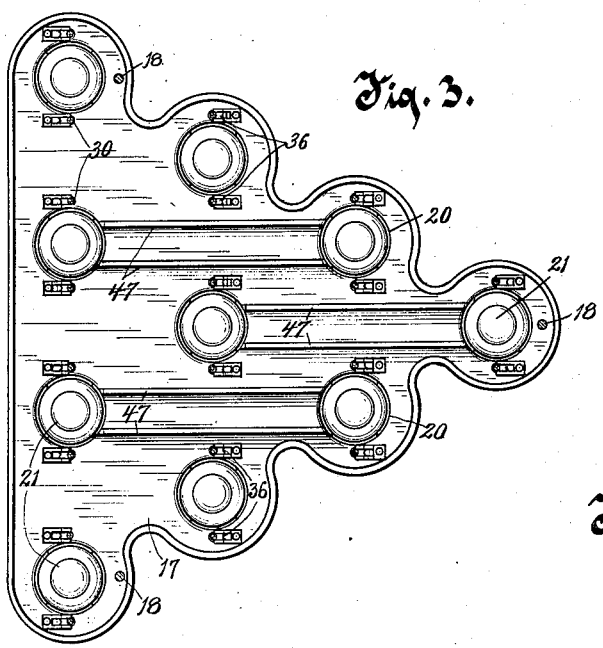
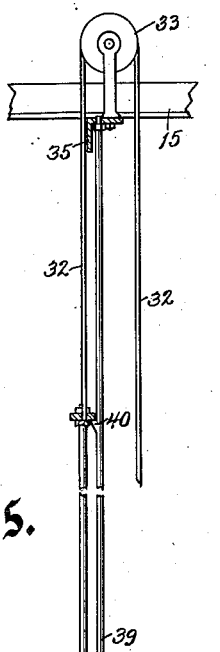
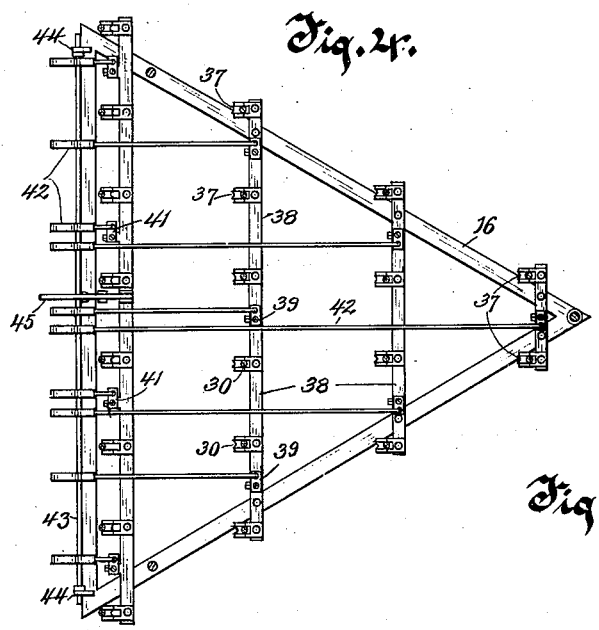
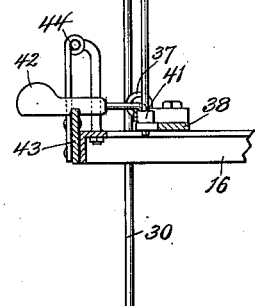
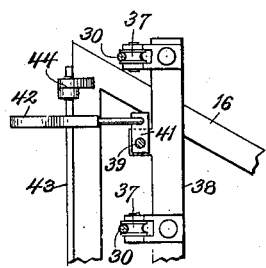

No. 853,212. PATENTED MAY 14, 1907.
H. J. ANDERSON.
PIN SETTER.
APPLICATION FILED SEPT. 13, 1906.
5 SHEETS—SHEET 4.
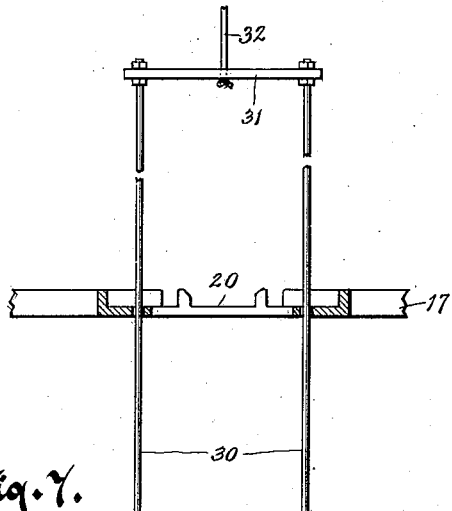
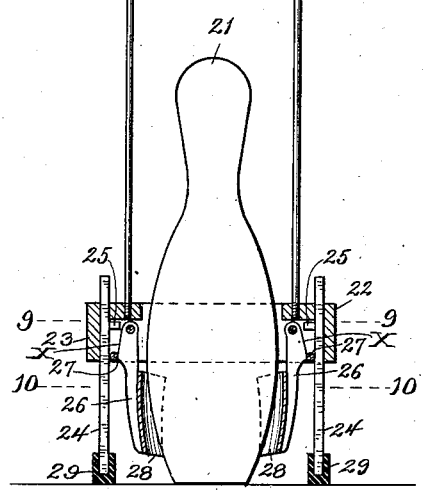
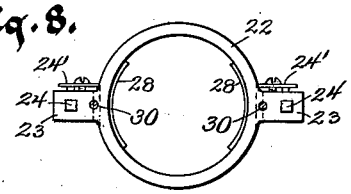
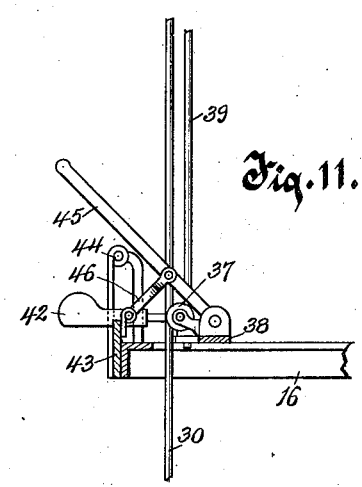
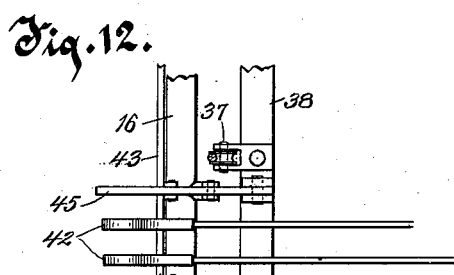
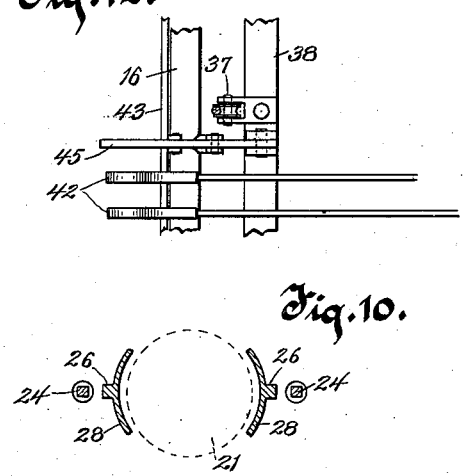
Witnesses.
C. H. Keeney,
Anna F. Schmittbauer
Inventor.
Hans J. Anderson,
By Benedict, Morsell & Caldwell
Attorneys.

No. 853,212. PATENTED MAY 14, 1907.
H. J. ANDERSON.
PIN SETTER.
APPLICATION FILED SEPT. 13, 1906.
5 SHEETS—SHEET 5.
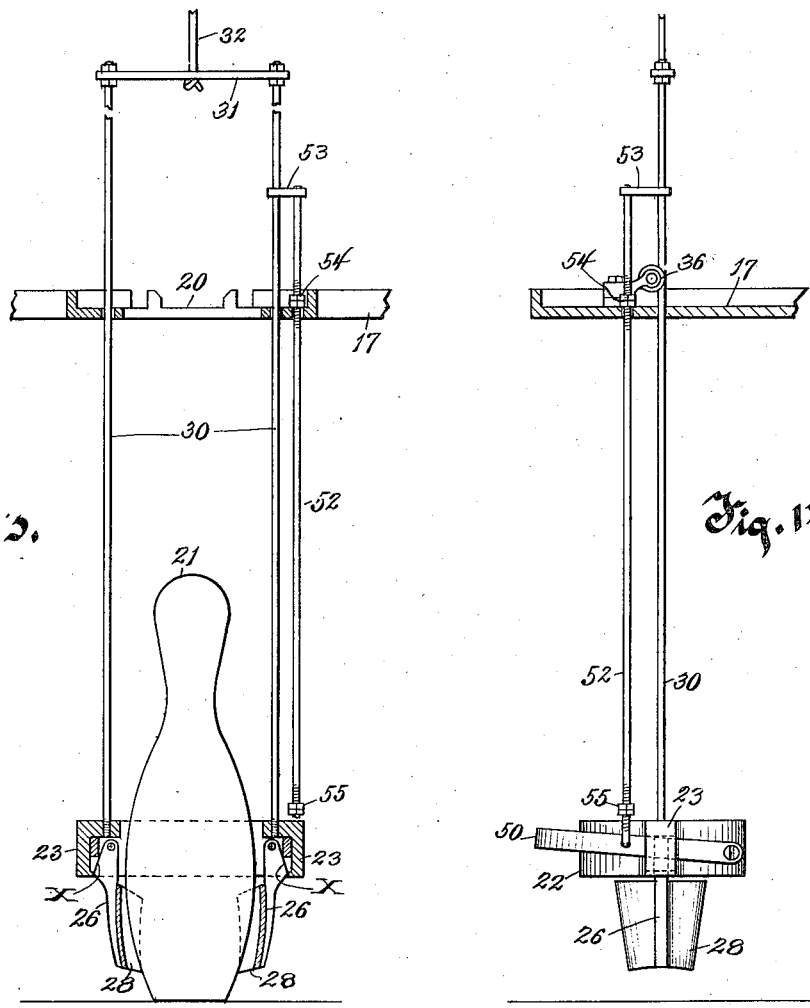
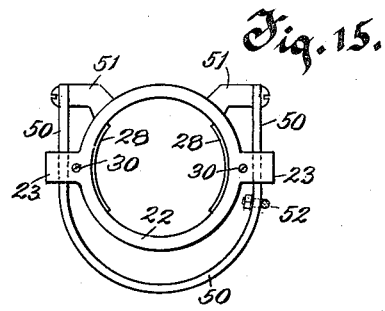
Witnesses. Inventor.
Hans J. Anderson,
By Benedict, Morsell & Caldwell.
Attorneys.

UNITED STATES PATENT OFFICE.

HANS J. ANDERSON, OF LAKEMILLS, WISCONSIN.

PIN-SETTER.

No. 853,212.   Specification of Letters Patent.   Patented May 14, 1907.

Application filed September 13, 1906. Serial No. 334,418.

*To all whom it may concern:*

Be it known that I, HANS J. ANDERSON, residing in Lakemills, in the county of Jefferson and State of Wisconsin, have invented new and useful Improvements in Pin-Setters, of which the following is a description, reference being had to the accompanying drawings, which are a part of this specification.

This invention relates to pin setters and has for its object to provide a means for accurately and speedily setting tenpins mechanically.

The invention comprises a lowering mechanism for each tenpin which will hold the pin in a position directly above its proper position on the alley, and which when released will slowly lower with the pin until the pin is seated in its proper position, when it automatically detaches itself from the pin and returns to its upper position, the release of the pin lowering mechanisms being accomplished either singly or in numbers.

Another object of this invention is to separate the releasing means from the pin lowering mechanisms and avoid interference with the operation of placing the tenpins in said mechanisms, and to provide a frame for guiding the tenpins in such operation.

Another object of this invention is to improve upon the details of construction of the releasing mechanism and of the pin lowering mechanism and of other features hereinafter more fully set forth.

With the above and other objects in view, the invention consists in the pin setter as herein claimed, its parts and combinations of parts, and all equivalents.

Figure 1:
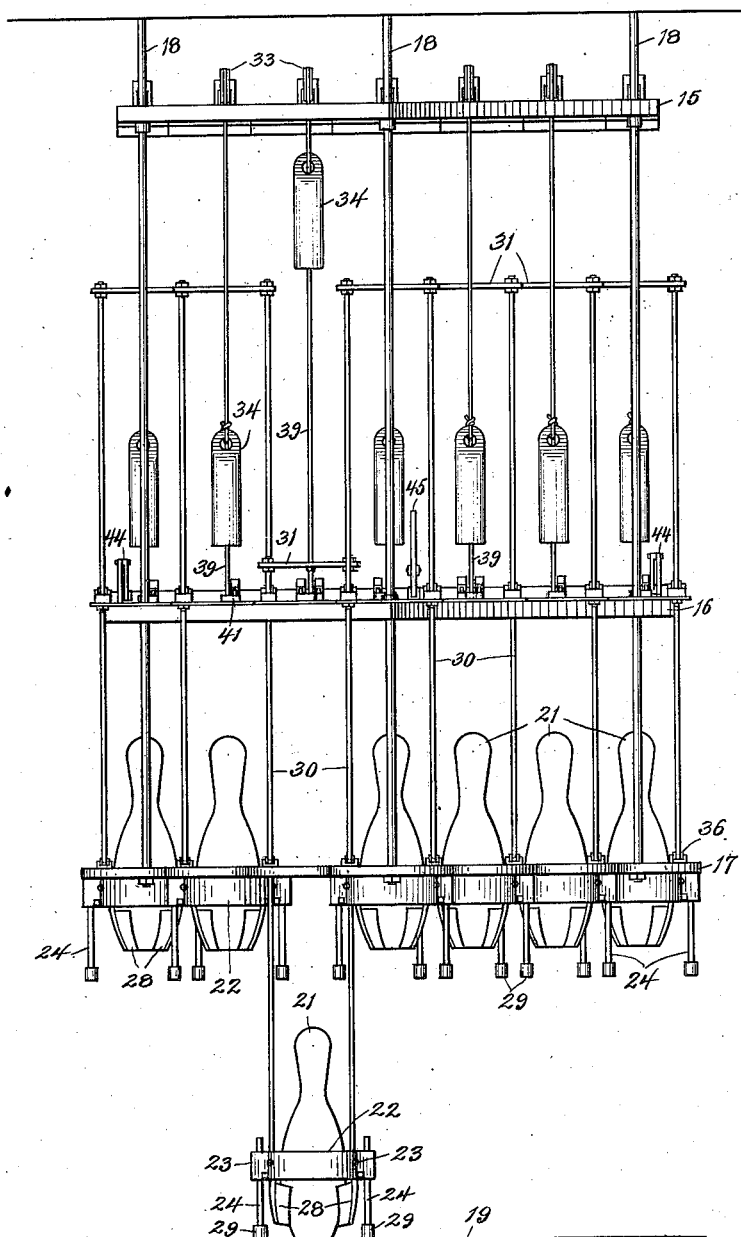
Figure 2:
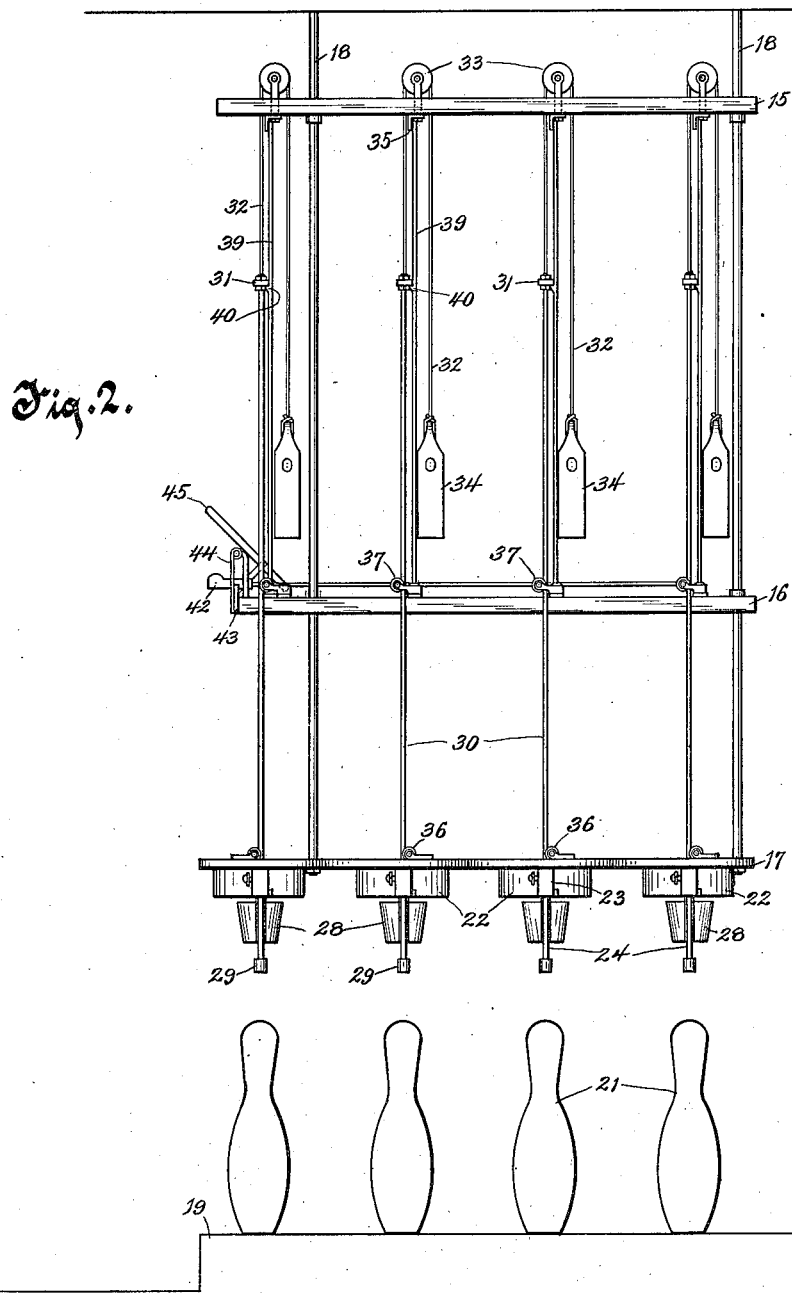

Referring to the accompanying drawings in which like characters of reference indicate the same parts in the several views:—Figure 1 is a front elevation of a pin setter constructed in accordance with this invention and showing one row of pins in the act of being placed in position by their lowering means and the others supported in their upper positions ready for being lowered; Fig. 2 is a side elevation thereof with all of the pins set; Fig. 3 is a plan view of the lower frame with the pins in place therein; Fig. 4 is a plan view of the intermediate frame; Fig. 5 is a sectional elevation showing details of construction of the releasing means; Fig. 6 is a plan view of parts thereof; Fig. 7 is a sectional elevation of a pin lowering pocket in the act of placing a pin; Fig. 8 is a plan view of the lower portion thereof; Fig. 9 is a transverse sectional view taken on the plane of line 9—9 of Fig. 7; Fig. 10 is a similar view taken on the plane of line 10—10 of Fig. 7; Fig. 11 is a sectional elevation of the releasing mechanism showing the operating lever; and, Fig. 12 is a plan view thereof. Fig. 13 is a sectional elevation similar to Fig. 7 of a modification of the pin lowering pocket; Fig. 14 is a side elevation thereof; and, Fig. 15, is a plan view.

In these drawings 15, 16 and 17 represent respectively, the top frame, the intermediate frame, and the bottom frame, all of triangular shape and suspended from above by means of three vertical rods 18 which pass through and are secured to said frame near their corners, the whole constituting a rigid framework suspended from the ceiling or other overhead support directly above the floor or raised portion 19 of a bowling alley. The top frame 15 and the intermediate frame 16 are preferably of angle iron construction and the lower frame 17 may be of sheet metal or cast metal construction with openings 20 therethrough of such a size as to freely permit the tenpins 21 passing through them. The openings 20 are arranged in the order of a tenpin set-up, so as to be directly above the spots or positions on the bowling alley where the tenpins are required to stand at the commencement of the play.

A pin lowering pocket is provided for each of the openings 20 and is adapted to receive one of the tenpins and hold it in position in the frame 17 until released, when it lowers with the pin to stand it in place and then automatically disengages from it and returns to its elevated normal position. Each of these pin lowering pockets consists of a ring 22 of approximately the same internal diameter as the openings 20, and provided with oppositely extending side projections 23 through which a pair of rods forming legs 24 are slidably mounted to move vertically, so as to extend their upper ends above the top surface of the ring 22 more or less. An inwardly extending lug 25 is carried by each of the legs 24 to travel in a slot of the ring and ride upon a cam surface $x$ of an arm 26 which is pivoted in said slot and causes it to swing inwardly when the leg 24 is moved downwardly by striking the frame 17. A stop pin 27 limits the outward swing of the arm 26 when the lug is raised out of engagement therewith and also serves as a guide for the leg 24. The two oppositely disposed arms of each ring 22 are provided with curved engaging plates 28 at their lower ends which form a pocket or receptacle between them when the arms are forced inwardly by the action of the lugs 25 on their cam surfaces. In order that the sliding movement of the legs 24 shall not be too free, spring retarding means 24' are secured by screws to the side projections 23 so as to be adjustable, and have inwardly extending lugs passing through openings in said projections and bearing against the legs. By adjusting the screws the pressure of the lugs against the legs may be varied to increase or diminish the friction produced and thereby enable the legs to be fully thrown from one position to the other on striking the floor or the lower frame 17, but prevent independent movements thereof at other times. The legs 24 are provided with cushioning tips 29 on their lower ends to prevent marring the surface of the bowling alley when the ring is lowered.

Each ring is supported by means of a pair of guide rods 30, which pass through perforations in the frame 17 on either side of the openings 20, and are connected at their upper ends between the top frame 15 and the intermediate frame 16 by a cross piece 31, having a cord or rope 32 leading from the middle thereof over a pulley 33 on the top frame with a weight 34 suspended on the other end. The pulleys 33 are mounted on parallel angle-iron cross bars 35 secured across the upper frame 15, and the guide rods 30 are preferably guided by rollers 36 on the lower frame 17 and by rollers 37 on parallel strips 38 of the intermediate frame, the rollers 36 and 37 being on opposite sides of the guide rods to keep them always in a vertical position.

The weights 34 are sufficiently heavy to overcome the weight of the empty movable pockets but are in turn overcome by the weight of said pockets when tenpins are contained therein, so that it is necessary to provide means for locking the pockets in their raised positions to enable them to support the pins. To this end, catch rods 39 extend between the top frame and the intermediate frame with their ends journaled in the parallel cross bars 35 and 38 thereof and have cam teeth 40 to engage the cross pieces 31 when the pockets are in the upper position. Each catch rod 39 has a crank 41 fixed on its lower end, and rods 42 are pivoted to said cranks and extend rearwardly to the back of the intermediate frame where they are provided with handles 42 with notches on their under sides to engage the upper edge of a strip 43. The strip 43 extends along the entire rear edge of the intermediate frame and is mounted so as to move rearwardly therefrom by being suspended on arched hinges 44. When any one of the handles 42 is lifted out of engagement with the strip 43 and is pulled rearwardly, it turns the catch rod 39 by means of the crank 41 and thereby swings the engaging tooth 40 from beneath the cross piece 31, allowing the pocket containing the pin to descend. When the strip 43 is moved to the rear it causes the release of all of the pockets by the connection of the handles 42 therewith. Any suitable means may be provided for swinging the strip 43 rearwardly, but the construction shown in Figs. 11 and 12 is preferred, wherein a lever 45 is pivotally mounted on the intermediate frame and has a toggle link 46 connecting it with the upper edge of the strip 43, so that as the lever 45 is forced downwardly the strip 43 is swung rearwardly, and as the lever 45 is returned to its upper position the strip 43 is likewise returned to its forward position.

The lower frame 17, as shown in Fig. 3, is preferably provided with an upstanding flange around its serrated edges and is also provided with pairs of parallel guide ribs 47 leading to the three pockets nearest the front from the pockets directly behind them, and this is to facilitate the placing of the more distant pins.

In operation, the pockets are normally in their upper position locked by the catch rods 39, so that the pins may be placed in them and remain in the upper position until they are desired to be set. This is accomplished by pulling the lever 45 rearwardly so as to swing the strip 43 away from the intermediate frame and thereby turn all of the catch rods 39 by means of their cranks to move their engaging teeth out of the path of the cross pieces. When so released the pockets slowly drop to the floor beneath and strike on the legs 24 which are thereby driven upwardly to carry their lugs 25 out of engagement with the cams of the arms, allowing the arms to swing outwardly to release the pins and leave them standing in their upright positions on the floor, while the pockets now relieved of the weight of the pins are returned to their upper position by the weights 34. On striking their upper ends against the bottom of the lower frame 17, the legs are returned to their lower position to again force the arms 26 inwardly to a position where they will again hold a pin between them. As the pocket reaches its normal upper position the cross piece 31 again springs over the cam tooth 40 of the trip rod 39, which is sufficiently yielding to spring and allow of this engagement. When it is desired to place a single pin, the proper handle 42 is lifted from engagement with the strip 43 and pulled rearwardly to release the single pocket and allow it to operate as above described, independently of the others.

It is apparent from the illustration of the lower frame 17 shown in Fig. 3 that this frame serves as an unobstructed guide for the placing of the tenpins in the pockets, so that the operation may be quickly and easily performed without danger of injuring the operating parts.

Obviously there are many details of construction here shown and described which are not essential to the invention in its broadest scope, and that various changes may be resorted to without departing from the invention as claimed.

In this modification the legs 24 are dispensed with and the pin engaging arms 26 are operated upon by the arms of a U-shaped lever 50, which is pivoted at its extremities to laterally extending lugs 51 on the ring 22, the arms of the lever passing through slots in the side projections 23 of the ring and engaging the cam surfaces $x$ of the arms 26 for this purpose. The U-shaped lever 50 is connected to a vertical controlling rod 52 which passes through an opening in the lower frame 17 and has a cross piece 53 at its upper end slidably mounted on one of the guide rods 30. A pair of jam nuts 54 are threaded on the controlling rod 52 near its upper end and a similar pair of jam nuts 55 are threaded thereon near its lower end, these pairs of nuts forming adjustable stops for striking against the lower frame 17 during the movements of the pin lowering pocket.

As the pin lowering pocket rises the controlling rod 52 moves upwardly therewith until the lower stop 55 engages the bottom of the lower frame 17 and is held thereby while the pocket completes its movement, thus causing the U-shaped lever 50 to swing downwardly and move its arms along the cam surfaces of the pin engaging arms 26 to move said arms together to a position in which they will hold a tenpin 21. When the pin lowering pocket is released, the weight of the tenpin lowers it as before described until the upper stop 54 engages the lower frame 17 and the slight further movement of the pocket causes the controlling rod 52 to lift the U-shaped lever 50 and release the pin engaging arms 26 from the tenpin, so that the pocket may ascend without the tenpin as with the previously described construction. The release of the tenpin may be timed to take place as soon as it reaches the floor by the adjustment of the jam nuts 54 and the degree of closure of the arms 26 may be changed by the adjustment of the jam nuts 55.

What I claim as my invention is;

1. In a pin setter, a pin lowering pocket comprising a ring, arms pivotally mounted on the ring, a cam on each arm, legs slidable through the ring, lugs on the legs for engaging the cams of the arms and forcing them inwardly when the legs are moved downwardly, said legs being adapted to be moved upwardly on striking the floor to release the lugs from engagement with the cams and permit the arms to swing outwardly, and means in the path of the legs to force them downwardly when the pocket is raised.

2. In a pin setter, a pin lowering means comprising a ring mounted to have vertical movements, rods slidable in the ring to form legs for striking the floor when the ring is lowered, arms carried by the ring for holding a tenpin between them and adapted to be held by the legs when in their lower position, means for engaging the legs and forcing them downwardly when the ring is raised to its upper position, and means for retarding the movements of the legs.

3. In a pin setter, a pin lowering means comprising a ring adapted to have vertical movements, rods slidable through the ring and forming legs adapted to be moved upwardly by engagement with the floor, arms pivotally mounted on the ring and adapted to be forced inwardly by the legs when in their lower position, means to be engaged by the legs when the ring is raised to its upper position for forcing said legs downwardly, and spring retarding means for the legs comprising spring pressed lugs adjustably clamped to the ring and bearing on the legs.

4. In a pin setter, a frame having openings through which the pins may pass, rings forming pin lowering pockets beneath the openings of the frame to receive the pins when placed through said openings, guide rods secured to the rings and passing through openings in the frame, a suspending means for the lowering pockets capable of lifting the empty pockets and of being overcome by the weight of the tenpins in the pockets, means for releasably holding the lowering pockets, said rings having side projections, arms pivotally connected in slots of the rings, curved plates carried by the arms, guide pins in the said slots for limiting the position of the arms, rods slidable through the ring and having lugs for engaging the cam surfaces of the arms and forcing said arms to swing inwardly, said legs being adapted to be moved upwardly by striking the floor and to be moved downwardly by striking the frame, and means for preventing accidental movement of the legs comprising spring lugs adjustably clamped to the side extensions of the rings and projecting through openings into frictional engagement with the legs.

5. In a pin setter, a frame having openings through which the pins may pass, lowering pockets beneath the openings of the frame to receive the pins, guide rods by means of which the lowering pockets are suspended passing through openings of the frame, said frame constituting a table for guiding the pins to the pockets, and another frame located above the first mentioned frame and provided with means for controlling the guide rods for supporting and releasing the lowering pockets.

6. In a pin setter, a frame having openings through which the pins may pass, lowering pockets beneath the openings of the frame to receive the pins, guide rods by means of which the lowering pockets are suspended passing through openings of the frame, said frame constituting a table for guiding the pins to the pockets, guide ribs formed on said table and constituting tracks leading to the foremost openings thereof to guide the pins to said openings, and means for releasably engaging the guide rods.

7. In a pin setter, a frame having openings through which the pins may pass, lowering pockets beneath the openings of the frame to receive the pins, guide rods by means of which the lowering pockets are suspended passing through openings of the frame, said frame constituting a table for guiding the pins to the pockets, rollers mounted on the frame and bearing on the guide rods, another frame located above the first mentioned frame, rollers thereon engaging the guide rods on the opposite side to the engagement of the rollers on the first mentioned frame, and means on said other frame for engaging and releasing the guide rods for holding the lowering pockets in an upper position or allowing them to descend.

8. In a pin setter, a pair of frames one arranged above the other, pulleys mounted on the upper frame, guides on the other frame, pin lowering pockets having guide rods passing through said guides, a cross piece connecting the guide rods of each lowering frame, lines connected with the cross pieces and passing over the pulleys, weights suspended by the lines capable of lifting the empty lowering pockets but being overbalanced by the weight of the pins in said lowering pockets, catch rods extending between the two frames and journaled therein, teeth on the catch rods for engaging the cross pieces of the guide rods, and cranks on the catch rods by means of which said rods may be turned to remove the teeth from engagement with the cross pieces and thereby release the lowering pockets.

9. In a pin setter, a pair of frames one arranged above the other, pulleys mounted on the upper frame, guides on the other frame, pin lowering pockets having guide rods passing through said guides, a cross piece connecting the guide rods of each lowering frame, a line connected with each cross piece and passing over one of the pulleys, a weight suspended by the line capable of lifting the empty lowering pocket but being overbalanced by the weight of the pin in said lowering pocket, catch rods extending between the two frames and journaled therein, teeth on the catch rods for engaging the cross pieces of the guide rods, cranks on the catch rods by means of which said rods may be turned to remove the teeth from engagement with the cross pieces and thereby release the lowering pockets, handles connected with said cranks for independent release of the lowering pockets, and means engaging the handles for moving them together to produce the simultaneous release of several lowering pockets.

10. In a pin setter, a pair of frames one arranged above the other, pulleys mounted on the upper frame, guides on the other frame, pin lowering pockets having guide rods passing through said guides, a cross piece connecting the guide rods of each lowering frame, a line connected with each cross piece and passing from one of the pulleys, a weight suspended by the line capable of lifting the empty lowering pocket but being overbalanced by the weight of the pin in said lowering pocket, catch rods extending between the two frames and journaled therein, teeth on the catch rods for engaging the cross pieces of the guide rods, cranks on the catch rods by means of which said rods may be turned to remove the teeth from engagement with the cross pieces and thereby release the lowering pockets, handles connected with said cranks for independent release of the lowering pockets, a strip hinged to the lower frame and adapted to engage the handles, and a toggle lever for swinging the strip and causing the simultaneous release of all of the lowering pockets.

11. In a pin setter, a lower frame and an intermediate frame and an upper frame suspended one above another at a distance apart, the lower frame having openings through which the pins may pass, lowering pockets located beneath each opening of the lower frame and comprising rings, arms pivotally mounted in said rings, rods slidable in the rings and forming legs to be moved upwardly on striking the floor, lugs carried by the legs to engage the arms and force them inwardly when the legs are moved downwardly by striking the lower frame, guide rods connected to the rings and passing through openings in the lower frame, guide rollers on the lower frame bearing on one side of the guide rods, guide rollers on the intermediate frame bearing on the other side of the guide rods, cross pieces connecting the guide rods of each lowering pocket, pulleys mounted on the upper frame, lines connected to the cross pieces and passing over the pulleys, weights connected to the lines capable of holding the lowering pockets in their upper positions against the lower frame but being overbalanced by the weight of the pins in the lowering pockets, catch rods journaled in the top and intermediate frames, teeth on the catch rods for engaging the cross pieces, cranks on the catch rods, handles connected to the cranks, a strip hinged to the intermediate frame and having the handles releasably connected thereto, and a toggle joint lever connected to the strip by means of which the strip may be moved to release all of the lowering pockets.

12. In a pin setter, a pin lowering pocket comprising a ring, arms pivotally mounted on the ring, a cam on each arm, a lever pivoted to the ring and adapted to ride on the cams of the arms, and means controlled by the position of the pin lowering pocket for swinging the lever to cause the arms to move toward or away from each other.

13. In a pin setter, a pin lowering pocket comprising a ring, arms pivotally mounted on the ring, a cam on each arm, a lever pivoted to the ring and bearing on the cams of the arms, a controlling rod connected with the lever, stops on the controlling rod, and means for engaging the stops during the movements of the pin lowering pocket for causing the lever to swing and move the arms with relation to each other.

14. In a pin setter, a frame having openings through which the pins may pass, rings forming pin lowering pockets beneath the openings of the frame to receive the pins when placed through said openings, guide rods secured to the rings and passing through openings in the frame, suspending means for the pin lowering pockets capable of lifting the empty pockets and of being overcome by the weight of the tenpins in the pockets, means for releasably holding the pin lowering pockets, said rings having side projections, arms pivotally connected to the rings and provided with cams, U-shaped levers pivotally connected at their ends to the rings and passing through the side projections of the rings to bear against the cams of the arms, controlling rods connected to the U-shaped levers and passing through openings in the frame, cross pieces connected with the controlling rods and slidably mounted on the guide rods, and jam nuts threaded on the controlling rods to form adjustable stops for engaging the frame to swing the U-shaped levers and cause the arms to move with relation to each other.

In testimony whereof, I affix my signature, in presence of two witnesses.

HANS J. ANDERSON.

Witnesses:
W. H. WOOD,
ROBT. FARYO.